United States Patent [19]
Bowman

[11] 3,934,707
[45] Jan. 27, 1976

[54] BELT ACCUMULATORS

[75] Inventor: Clyde L. Bowman, Grand Rapids, Mich.

[73] Assignee: Rapistan Incorporated, Grand Rapids, Mich.

[22] Filed: Apr. 24, 1974

[21] Appl. No.: 463,525

[52] U.S. Cl. .................................. 198/34
[51] Int. Cl.² ............................... B65G 47/26
[58] Field of Search............ 198/34, 40, 127 R, 219, 198/DIG. 19; 193/35 A, 35 SS, 40

[56] References Cited
UNITED STATES PATENTS

| | | | |
|---|---|---|---|
| 3,217,859 | 11/1965 | Bartlo et al. | 198/34 |
| 3,251,452 | 5/1966 | Conway et al. | 198/34 |
| 3,355,008 | 11/1967 | Milazzo | 198/219 |
| 3,439,790 | 4/1969 | Langley et al. | 193/35 SS |

FOREIGN PATENTS OR APPLICATIONS

| 1,481,291 | 2/1967 | Germany | 198/127 R |
|---|---|---|---|

Primary Examiner—Evon C. Blunk
Assistant Examiner—Joseph E. Valenza
Attorney, Agent, or Firm—Price, Heneveld, Huizenga & Cooper

[57] ABSTRACT

A continuously driven belt conveyor transports and accumulates articles supported thereon. Ways are positioned alongside the conveyor belt and are movable to vary the relative vertical position of the ways between an accumulation position wherein the support surface of the ways is above the conveyor belt causing the articles to accumulate and a drive position wherein the support surface of the ways is below the conveyor belt to permit movement of the articles therealong. Preferably, the ways are moved vertically by elongated inflatable tubes which lift the ways together with the articles above the moving conveyor surface.

7 Claims, 9 Drawing Figures

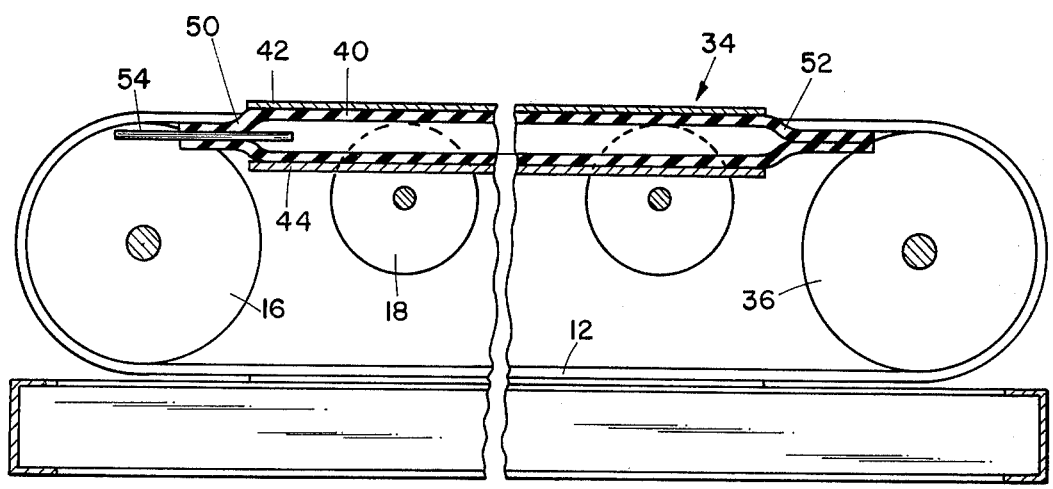
FIG 4
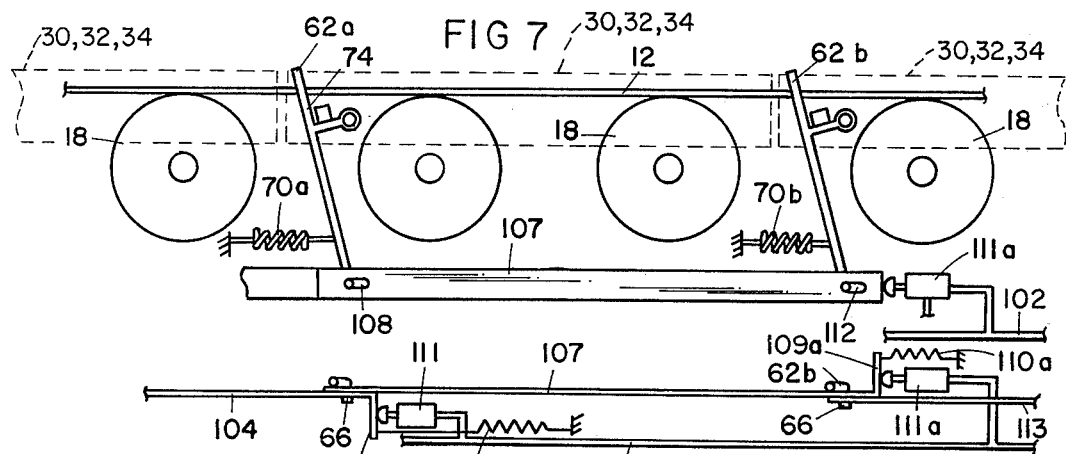
FIG 7
FIG 8
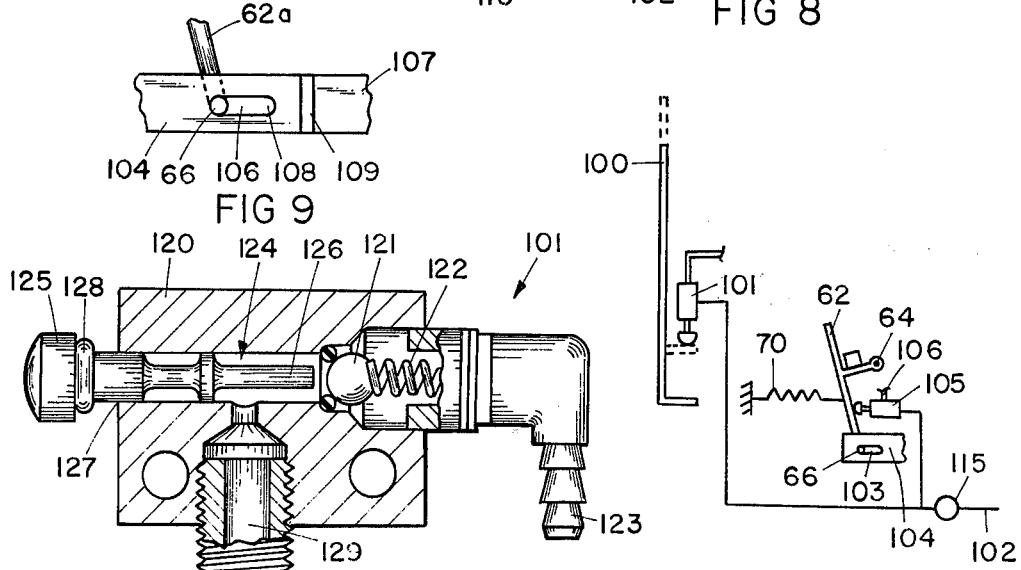
FIG 9
FIG 6
FIG 5

BELT ACCUMULATORS

BACKGROUND OF THE INVENTION

This invention relates to conveyors, and more particularly, to a belt conveyor capable of accumulation.

Conveyors of the wheel and roller-type utilize a variety of accumulation devices, a more popular type being the kind where the application or release of propelling force on the wheels or rollers is effected through changes in the vertical position of the propelling member. One way of effecting this is by supporting the belt on flattened rollers. Another way of doing this is by supporting the belt on pivoted hangers. Examples of these types of accumulating conveyors are illustrated in U.S. Pat. No. 3,253,697 entitled VARIABLE PRESSURE CONVEYOR issued May 31, 1966 to Maynard J. DeGood and Clyde L. Bowman, U.S. Pat. No. 3,062,359 entitled ACCUMULATOR CONVEYOR issued Nov. 6, 1962 to T. C. McGow, et al., and U.S. Pat. No. 3,012,652 entitled LIVE ROLLER CONVEYOR WITH SENSING issued Dec. 12, 1961 to N. C. Poel, et al. These types of conveyors provide both selective accumulation and automatic termination of article movement when the lead article's forward motion is stopped for any reason.

A principal drawback with roller and wheel conveyors is that the article containers themselves must be of sufficient strength to support the articles contained therein since the roller or wheel support is intermittent in the sense that it does not provide a continuous support surface. Thus, if the container has an insufficient bottom area to provide adequate support for its contents or it is deteriorated for example by moisture, the bottom of the container interferes with proper movement along the conveyor. There are many types of articles and containers which cannot be effectively transported on roller or wheel conveyors, such as for example, chimed drums, crated goods, or bagged articles such as potatoes, citrus fruit and the like. Further, no practical sensing mechanisms are available to detect such articles or containers.

Present ecological trends in this country indicate a dissatisfaction with the size and material consumption of individual packaging as presently practiced. Such packaging provides a vast amount of waste which must be handled and disposed of. An alternative trend is foreseen whereby goods will be packed and shipped in much less massive, or, by present standards, flimsy or low strength packages. Where relatively flimsy packages are utilized, a belt conveyor offers distinct advantages over a wheel or a roller conveyor since it provides a substantially continuous support surface. Satisfactory accumulation for belt conveyors, however, has not been obtained. Still another drawback to the present accumulation art is that regardless of the type of conveyor, the devices of the prior art are quite expensive and complex since they require, in some fashion, a complete shifting of a major component part of the drive support undercarriage. Thus, there is a need today in this art for an improved mechanism for providing conveyor accumulation at selected desired locations--particularly one that operates satisfactorily in a belt conveyor.

SUMMARY OF THE INVENTION

In accordance with the invention, one or more article supporting and transporting conveyor members are driven continuously within a conveyor trackway. Support ways are positioned alongside the conveyor member, selected portions of the ways or conveyor member being movable vertically relative to each other between a drive position wherein the upper surface of the conveyor member is above the ways for movement of the articles and an accumulating position wherein the upper surface of the conveyor member is below the ways causing the article to rest entirely on the ways. Control means are provided for actuating the vertical movement automatically or upon demand to provide accumulation at selected locations for termination of article movement when the lead article is stopped for any reason. In this type of conveyor, the entire weight of the articles, during transport mode, is supported by the conveyor belt and during accumulation mode by the ways.

In the preferred embodiment, the conveyor member is a driven belt supported at generally constant elevation and the ways are moved vertically by elongated inflatable tubes which, when inflated, raise a support surface above the belt, lifting the articles entirely off the belt. The ways are of preselected length and arranged in tandem along each side of the belt. Control means are provided for sensing the articles and causing inflation of one or more groups of tubes to cause accumulation.

A principal advantage of the present invention is the utilization of one or more flat conveyor belts which both entirely support and transport the articles conveyed in an environment which permits selected accumulation and termination of article flow when the lead article is stopped for any reason. The upward movement of the ways provides more gradual transition between transport and accumulation modes thereby decreasing the propensity to rupture or damage the cartons or articles. The utilization of a conveyor belt as the sole article support during transport mode increases the effective area of article support, permitting the use of flimsier containers. The overall simplicity of the invention provides automatic accumulation economically for articles and containers not previously capable of accumulation.

DESCRIPTION OF THE DRAWINGS

FIG. 4 is a fragmentary side elevation view in cross section illustrating the conveyor incorporating the invention;

FIG. 5 is a schematic view, in elevation, of the fluid pressure control system at the discharge end of the conveyor;

FIG. 6 is a cross-sectional view of the actuating mechanism of the invention;

FIG. 7 is a partially schematic illustration, in elevation, of one section of the fluid pressure system controlling the operation of the accumulator ways;

FIG. 8 is a partially schematic illustration, in plan view, of one section and portions of two adjacent sections of the fluid pressure system controlling the operation of the accumulator ways; and FIG. 9 is an enlarged fragmentary view of the joint between two of the control links for the fluid pressure control system.

DESCRIPTION OF THE PREFERRED EMBODIMENT

Figure 1:
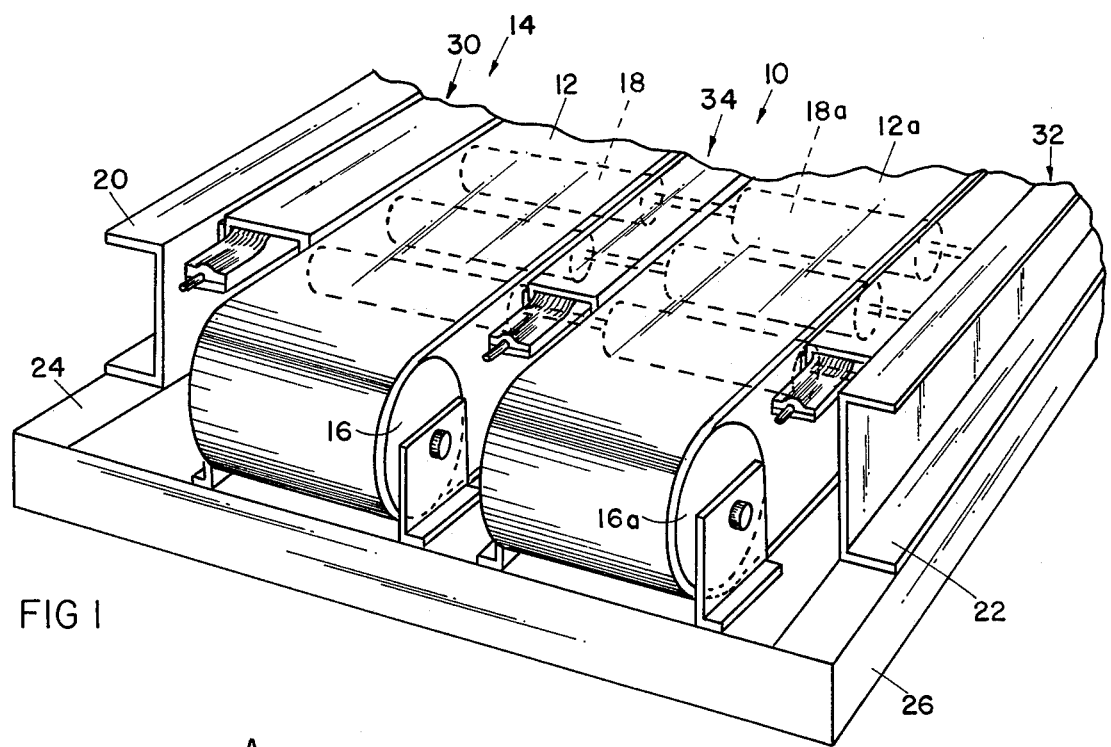
FIG. 1 is a fragmentary perspective view of a belt conveyor incorporating this invention.

Referring now to the drawings, in detail, FIG. 1 illustrates a belt conveyor 10 comprising a pair of endless belts 12 and 12a mounted within a trackway 14. Conveyor belts 12, 12a are driven, respectively, about idler rollers 16, 16a and supported by a group of support rollers 18, 18a arranged in spaced relationship along the conveyor in a common plane to form a conveyor transport surface. Rollers 18 and 18a are suspended by side channel supports 20 and 22 which are, in turn, supported on a pair of longitudinally extending support arms 24 and 26. Any other side frame structure may be used with this invention.

The endless belts 12 and 12a are spaced longitudinally from each other and from side channels 20 and 22. Within these spacings are mounted and secured, a plurality of longitudinally extending ways 30, 32 and 34 forming accumulators. The outer ways 30, 32 are located between the conveyor belts 12, 12a and their adjacent channel supports 20 and 22 while the intermediate way 34 is mounted in the medial lane formed between the two continuous belts 12, 12a.

Figure 2:
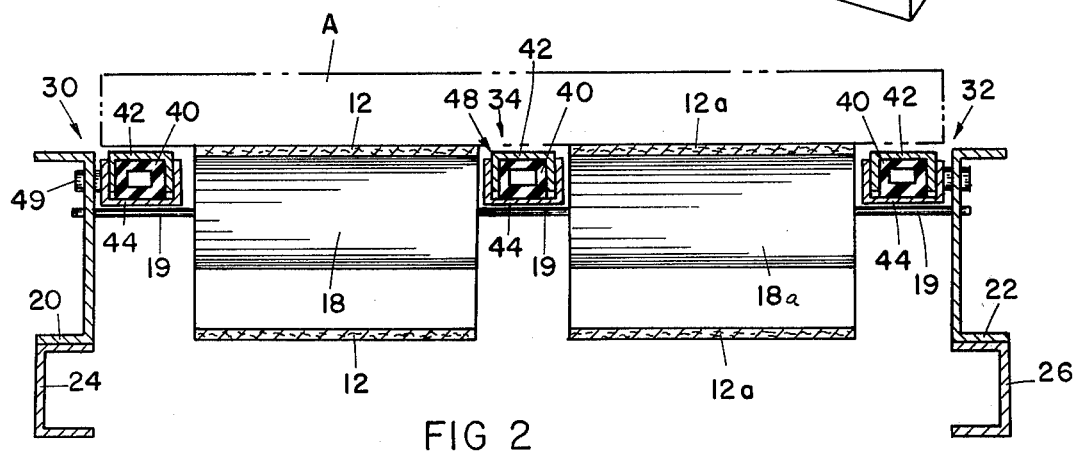
FIG. 2 is a cross-sectional view of the conveyor illustrated in FIG. 1 illustrated in an article conveying position or mode.
Figure 3:
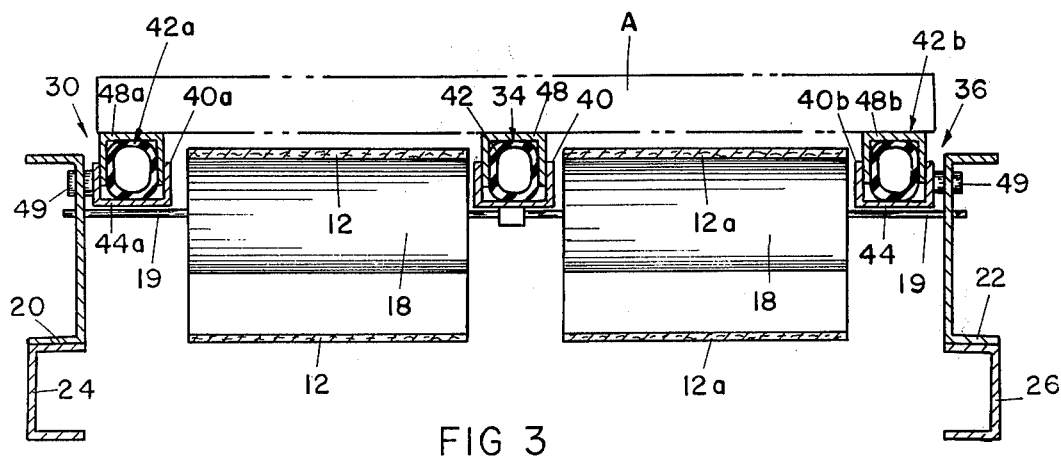
FIG. 3 is a cross-sectional view similar to FIG. 2 illustrating the conveyor in an article accumulating position or mode.

Referring to FIG. 4, one of the ways 34 is illustrated extending along a section of the trackway with the endless conveyor belt 12 illustrated in position behind way 34. It is continuously driven by the powered end pulley 36. Each way 30, 32 and 34 includes an inflatable elongated tube-like member 40 seated between its upper and lower channels 42 and 44. Referring to FIGS. 2 and 3 in addition to FIG. 4, the lower upstanding U-shaped channel 44 is supported on the same axles 19 as the belt supporting rollers 18 and 18a. As such it is vertically stationary. The upper inverted U-shaped channel 42 has a high friction surface and a width smaller than channel 44 to permit telescoped positioning therewithin. The inflatable tube 40 seats with the pocket or chamber formed by the channels 42 and 44. When tube 40 is inflated, the pressure acts against upper channel member 42 since lower channel member 44 is stationary. The resultant inflation urges upper channel member 42 upwardly in a vertical direction within the confines of the arm portions of lower channel 44 from the position illustrated in FIG. 2 to that illustrated in FIG. 3 lifting the web portion 48 of the upper channel above the plane of the top surface of the belts 12, 12a. In doing so, the ways lift an article such as the article "A" off the belts 12 and 12a as illustrated in FIG. 3. Article "A" is illustrated in transport mode in FIG. 2 and completely disengaged from the ways in FIG. 3 in the accumulation mode. It is important that the tubes 40 for all of the ways affecting a particular article be inflated equally and simultaneously.

Referring to FIG. 4, the tube-like member 40 may be made of a fabric reinforced neoprene rubber. The member 40 is closed at both its ends 50 and 52 in any convenient fashion such as by vulcanizing. One of the ends such as end 50 is provided with an inlet tube or fitting 54 which is connected by means of suitable tubing (not shown) through an actuator control valve 60 to a source of fluid under pressure (not shown).

Referring to FIG. 5, a sensor arm 62 is pivotally anchored about a suitable pivot 64 secured to the framework of the conveyor support. The upper end of the sensor arm projects above the surface of the belts 12 and 12a, preferably between the center way 34 and one of the belts.

FIGS. 5 – 9 illustrate one type of arrangement which can be used to control the sequential actuation of the various sections of the conveyor. FIG. 5 schematically illustrates a stop 100 which can be erected into the path of the articles by any suitable means. When the stop is erected (illustrated in phantom) it opens the normally closed valve 101 thereby admitting fluid under pressure from any suitable source to the common supply line 102. The valve 101 will remain open as long as the gate is erected.

When the first or lead article reaches the conveyor section at the gate, it will depress sensor 62 which will rock counterclockwise about its pivot support against the bias of the spring 70. As it does so, its lower end 66 will shift lengthwise along the slot 103 in the control link 104. It will also open normally closed valve 105 which is supplied from common supply line 102. This will admit fluid to the inflatable tube associated with the sensor 62 through line 106, raising the ways and shifting that section of the conveyor into accumulation mode.

At the next station upstream the opposite end of the control link 104 is also slotted at 106 to receive the end 66 of the next sensor 62a (FIGS. 8 and 9). Sensor 62a is also biased into erected position by a spring 70. At this same end, the control link 104 overlaps the end of a second control link 107 which is also slotted at 108 (which cannot be seen because it is superimposed behind slot 106). When the sensor 62a is erected and both control links 104 and 107 are in normal or transport mode position, the end 66 of sensor 62a is at the downstream ends of both slots 106 and 108. As shown in FIG. 8, the upstream end of control link 104 has a laterally extending flange 109 to which is attached a spring 110 urging the link to shift upstream or to the right as illustrated. The flange 109 also engages the normally closed valve 111 which, in turn, is connected to the common supply line 102.

The upstream or right-hand end of control link 107 is identical to that of link 104, having a flange 109a, a spring 110a and a normally closed valve 111a also connected to supply line 102. It is also slotted at 112 (FIG. 7) and overlaps the slotted downstream end of control link 113 (FIG. 8). The end 66 of sensor 62b is mounted through the slots at the overlapping ends of control links 107 and 113 in a manner identical to that illustrated in FIG. 9 for sensor 62a.

The springs 110 and 110a are weaker than any one of the springs 70, 70a or 70b. Thus, when sensor 62 is depressed the control link 104 cannot shift upstream or to the right as illustrated, because the spring 110 cannot overcome the bias of spring 70a which is effectively holding the end 66 of sensor 62a at the left-hand end of slot 106. Thus, valve 111 remains closed. When the next article depresses sensor 62a, this restraint is eliminated and spring 110 shifts control link 104 to the right opening valve 111. This inflates the tubes supporting the ways associated with sensor 62a.

In repeat fashion, the shifting of sensor 62a does not permit control link 107 to shift because it is restrained by the erected sensor 62b. Thus, the several way sections will be sequentially actuated, one by one, upstream of the conveyor as more and more articles accumulate.

To unload the conveyor and reestablish transport mode, the stop 100 is lowered, closing valve 101. Valve 101, as illustrated in FIG. 6, provides an automatic bleed when it is closed. This exhausts fluid through open valve 105 from beneath the ways adjacent the stop. This will redeposit the first accumulated article on the belts and it will be moved off sensor 62. The spring 70 will then erect the sensor, shifting control link 104 to the left closing valve 111. Valve 111 being identical in construction to valve 101 will then bleed fluid from its associated tubes lowering the ways at sensor 62a. This process will continue sequentially upstream of the conveyor until transport mode has been established for all of the articles.

The opening of valve 101 is prevented from bleeding fluid through any of the valves except valve 105 by the check valve 115 installed in line 102 between valves 105 and 111.

Although various types of valves can be used with this invention, a preferred embodiment is illustrated in FIG. 6. Although this is described as valve 101, it will be understood that the following description applies equally to valves 105, 111 and 111a. The valve 101 has a centrally chambered housing 120. One end of the chamber is enlarged to form a seat for the ball check 121 which is biased closed by the spring 122. Fluid under pressure is supplied to the valve through the inlet port 123.

Also seated in the chamber is the piston 124 having at one end, an exterior head 125 and at the other end a reduced shank 126. The spindle adjacent the head has a sufficiently loose fit in the housing to provide a bleed 127 from the inner portion of the chamber. Surrounding the spindle at the head is an O-ring seal 128 which, when the spindle is shifted to open the ball check 121, closes the bleed 127. Fluid is discharged from the central chamber through the outlet port 129.

Although not illustrated, it will be recognized that the laterally adjacent ways of each section or zone must be operated simultaneously. Thus, each of the valves 105, 111 or 111a is connected to as many of the inflatable tubes as there are ways in the section. By connecting them to a single valve, coordinated operation is assured.

It will be recognized that a single, wide belt could be substituted for the two belts 12 and 12a. It will also be recognized that for certain applications, chains or mesh-type belts could be substituted for belts.

Although but one embodiment has been shown and described in detail, it will be obvious to those having ordinary skill in this art that the details of construction of this particular embodiment may be modified in a great many ways without departing from the unique concepts presented. It is, therefore, intended that the invention is limited only by the scope of the appended claims rather than by particular details of construction shown, except as specifically stated in the claims.

The embodiments of the invention in which an exclusive property or privilege is claimed are defined as follows:

1. An accumulator conveyor for conveying articles and packages comprising an endless, continuously driven article transport means defining at least one continuous article transporting and support surface moving continuously in one direction, at least one pair of article lifting means arranged adjacent each side of said conveyor for lifting packages and articles from transporting engagement with said continuous supporting surface; said lifting means including a plurality of vertically shiftable support means for shifting the conveyed articles or packages between a first position wherein articles on said conveyor above the same are lifted up from transport influence by said transport means and a second position in which articles are supported entirely on said transport means; said vertically shiftable support means having high friction surfaces, being elongated and extending at least the length of the packages or articles being conveyed, being stationary lengthwise of said article transporting and support surface, and being arranged adjacent, along and generally parallel to each side of said article transporting and support surface; said support surface extending substantially entirely between said pair of vertically shiftable support means to substantially entirely support any packages and articles on said support surface; a normally inoperative powered actuator for raising and lowering each of said support means; a sensor connected to each of said powered actuators for actuating the same in response to the presence of an article; a stop; means for moving said stop into the path of any articles or packages on said transport means; means interconnecting said stop and said sensor to allow activation of said actuators only when said stop is in the path of any articles or packages on said transport means.

2. An accumulator conveyor as described in claim 1 including a plurality of pairs of lifting means arranged in tandem along either side of said transport means; a second sensor; each of said powered actuators for each of said lifting means except that at the discharge end of said conveyor being connected to said second sensor; the first of said sensors being located in the same section of said conveyor as the lifting means moved by the actuator connected to said first sensor; and second sensor being located in the next downstream section of said conveyor; second means interconnecting said sensors and responsive to the positioning of said stop in the path of any articles and packages on said transport means whereby said actuator connected to said first sensor remains inoperative until both of said sensors simultaneously respond to the presence of articles and said stop is moved into the path of any articles or packages on said transport means.

3. An accumulator conveyor as described in claim 2 wherein said transport means is a belt and said lifting means are elongated way bars flanking the sides of said belt and said actuators are pneumatically inflatable tubes beneath said way bars; a source of air under pressure and a normally closed valve between said source and each of said actuators; said stop and each of said sensors connected to the valve for its associated actuator, said second interconnecting means including a lost motion connection rendering said first sensor inoperative to open said valve unless said second sensor is responding to the pressure of an article.

4. An accumulator conveyor as described in claim 1 wherein said article transport means is a pair of parallel spaced belts forming a medial lane between them; said lifting means including a plurality of said support means arranged in tandem in said medial lane and operatively interconnected to the laterally adjacent support means of said lifting means which flank said belts.

5. An accumulator conveyor as described in claim 4 wherein the width of said belts is such as to constitute a major portion of the width of the conveyor.

6. An accumulator conveyor as described in claim 1 wherein said lifting means has a lower U-shaped channel rigidly supported from said frame and a plurality of upper channels of inverted U-shape seated within said lower channel; said channels forming an elongated chamber therebetween; said powered actuators being elongated inflatable tubes seated in said chamber and arranged in tandem, one beneath each of said upper channel sections.

7. An accumulator conveyor adapted for conveying articles and packages comprising an endless belt driven continuously in one direction defining an article transporting and support surface, a plurality of accumulator sections having a pair of accumulator members, one accumulator member on each side of and paralleling said belt and being arranged laterally opposite a corresponding accumulator member adjacent the opposite side of said belt, said support surface of said belt extending substantially entirely between said pair of accumulator members in each of said sections to substantially entirely support any package or article on said support surface; each of said accumulator members having a rigid article engaging portion; a powered actuator beneath each of said article engaging portions for shifting said article engaging portion from a normal first lower position beneath said article transporting surface to a raised second position for supporting an article above said belt, the powered actuators of each pair of members being operatively connected for simultaneous operation; the actuators for each pair of actuator members being separately operable from those of the other pairs of actuator members; an article responsive sensor adjacent each of said sections, each sensor connected to the powered actuators for the pair of accumulator members in one of said sections to actuate said actuators; a stop; means for moving said stop into the path of any articles or packages on said belt; first means interconnecting said stop and said sensors to allow activation of said actuators only when said stop is in the path of any articles or packages on said belt; and second means interconnecting the sensor for one section with the sensors of each adjacent section, said second interconnection means restraining the sensor of one section from activating its associated powered actuators unless the sensor of the next downstream section is responding to the presence of an article.

* * * * *